United States Patent [19]
Honsho

[11] 3,821,571
[45] June 28, 1974

[54] FLYWHEEL MAGNETO
[75] Inventor: Yoshihisa Honsho, Himeji, Japan
[73] Assignee: Mitsubishi Denki Kabushiki, Tokyo, Japan
[22] Filed: Aug. 20, 1973
[21] Appl. No.: 389,674

Related U.S. Application Data
[63] Continuation of Ser. No. 244,798, April 17, 1972, abandoned.

[52] U.S. Cl. .................. 310/70 R, 310/42, 310/153
[51] Int. Cl. ............................................. F02p 1/02
[58] Field of Search ........ 310/42, 43, 70, 153, 154, 310/156

[56] References Cited
UNITED STATES PATENTS
| | | | |
|---|---|---|---|
| 2,806,156 | 9/1957 | Phelon | 310/153 X |
| 2,856,550 | 10/1958 | Phelon | 310/153 |
| 3,114,851 | 12/1963 | Santi | 310/153 |
| 3,192,439 | 6/1965 | Shaw | 310/153 X |

Primary Examiner—J. D. Miller
Assistant Examiner—Robert J. Hickey
Attorney, Agent, or Firm—Oblon, Fisher, Spivak, McClelland & Maier

[57] ABSTRACT

A flywheel magneto having one or more magnetic block assemblies composed of arc-shaped poles, ferrite magnets and substantially Z-shaped yokes, the component parts being appropriately secured to each other through thermosettable adhesive resin. The magnetic block assemblies are placed in a furnace for curing the resin, after which they are secured to the inner peripheral surface of a cylindrical flywheel of the magneto. The output capacities of the magnetos may be predetermined by the number of magnetic blocks utilized, as well as the particular materials employed and relative placement of the component parts.

7 Claims, 4 Drawing Figures

PATENTED JUN 28 1974  3,821,571

FLYWHEEL MAGNETO

This is a continuation, of application Ser. No. 244,798, filed Apr. 17, 1972 now abandoned.

BACKGROUND OF THE INVENTION

1. Field Of The Invention

The present invention relates generally to flywheel magnetos thereof, and more particularly to an improved flywheel magneto which is economical to manufacture and which is capable of being mass-produced.

2. Description Of The Prior Art

Conventional flywheel magnetos ordinarily comprise a structure in which a substantially M-shaped core, or one having a base and three spaced legs or poles depending therefrom, is used as a stator core, while an exciting or generating coil is wound upon the central pole of the core for the purpose of increasing the productivity of the field magnets. Ferrite is normally utilized as the magnetic substance comprising the field magnets as such is readily available and therefore manufacturing costs may be reduced. Ferrite magnets, however, are usually fragile or brittle and have low magnetic flux densities and high coercive forces.

Furthermore, in manufacturing such conventional flywheel magnetos, the ferrite magnets have heretofore been directly fixed upon the inner circumferential surface of the flywheel, which may be made of various materials, such as, for example, iron plate or cast iron, with a thermosettable resin, such as, for example, epoxy resin, after which the ferrite magnets are usually magnetized in a radial direction, that is, in a direction corresponding to the thickness of the particular magnet. It is then necessary to place the magnets in a furnace so as to cure the thermosettable resin. It has been found, however, that when the ferrite magnets are adhered upon a flywheel of large dimensions and which is made, for example, of cast iron, the thermal capacity of the flywheel is so large that most of the heat energy is absorbed by the flywheel during this curing process. Accordingly, it has been necessary to place the flywheel in a furnace maintained at very high temperatures. Such processes, however, result in excess time being required for the heating and cooling of such large flywheels, thereby resulting in a decrease in productivity.

SUMMARY OF THE INVENTION

Accordingly, it is an object of the present invention to provide an improved flywheel magneto having a high degree of accuracy, and which is economical to manufacture.

Another object of the present invention is to provide an improved flywheel magneto which is capable of being mass-produced.

Still another object of the present invention is to provide an improved flywheel magneto which may be produced by the utilization of a furnace of small heating capacity.

Yet another object of the present invention is to provide an improved flywheel magneto wherein the magnetic energy output capacity is predetermined as may be required.

The foregoing objects are achieved according to this invention through the provision of a flywheel magneto having one or more magnetic block assemblies composed of arc-shaped poles adhered to respective ferrite magnets which are, in turn, directly adhered to the larger arc or circumferential segments of yokes taking the shape of an arcuate piece connected integrally at one end to an end of an arcuate piece of slightly smaller radius of curvature extending in the opposite direction by a radial piece, or being substantially Z-shaped. The arc poles of the magnetic blocks have associated therewith a stator core having a flat base and three depending legs, upon the middle leg of which is wound an exciting or generator coil. The yokes of the magnetic blocks are secured to the inner surface of a cylindrical flywheel. In manufacturing the flywheel magneto, thermosettable adhesive resin is initially applied to the arc-shaped poles, ferrite magnets, and the Z-shaped yokes, so as to construct the magnetic block assemblies. The block assemblies are then placed in a furnace in order to cure the thermosettable adhesive resin. The cured block assemblies are then removed from the furnace, allowed to cool, and are then secured to the cylindrical flywheel.

BRIEF DESCRIPTION OF THE DRAWINGS

Various other objects, features and attendant advantages of the present invention will be more fully appreciated as the same becomes better understood from the following detailed description when considered in connection with the accompanying Drawings, in which like reference characters designate like or corresponding parts throughout the several views, and wherein.

DESCRIPTION OF THE PREFERRED EMBODIMENTS

Figure 1:
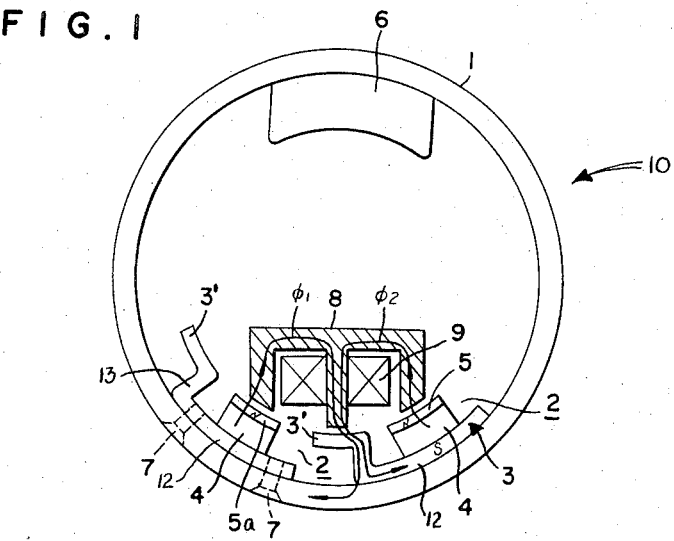
FIG. 1 is a front, partially sectioned, view of an embodiment of a flywheel magneto constructed according to this invention.

Referring now to the Drawings, and more particularly to FIG. 1 thereof, there is shown a flywheel magneto generally indicated by the reference character 10 comprising a cylindrical flywheel 1 which may be made of a magnetic substance, such as, for example, steel plate or cast iron, or alternatively, the flywheel may be made of a non-magnetic substance, such as, for example, aluminum, depending upon the magneto characteristics desired, as will be disclosed more fully hereinafter. A plurality of magnetic block assemblies 2 are shown, each of which is secured to an inner circumferential portion of flywheel 1 by means of screws 7, and each being composed of a yoke 3 being substantially Z-shaped and having a small arc-shaped portion 3' and a large arc-shaped portion 12 being integrally joined at their ends by a radially extending arm 13, a ferrite magnet 4, and an arc-shaped pole 5. Screws 7 are mounted within the large arc-shaped portion 12 of yoke 3 through the cylindrical flywheel 1. It will be thus understood that due to the relative locations of the magnetic block components, the small arc-shaped portion of the yoke constitutes an arc pole.

Still referring to FIG. 1, it will be seen that the ferrite magnet 4 may be adhered with thermosettable adhesive resin, such as, for example, epoxy resin, to the inner surface of the large arc-shaped portion 12 of yoke 3, while the arc-shaped pole 5 is adhered with thermosettable resin, such as, for example, epoxy resin, to the inner surface of ferrite magnet 4. Pole 5 is positioned adjacent to the arc pole 3' of small radius of curvature of the yoke 3, and it is thus seen that each magnetic block assembly 2 is bipolar, the arc poles of smaller radius of curvature of the yoke 3 and the arc-shaped poles 5 of similar radius of curvature being arranged in alternate fashion about the circumferential inner periphery of the flywheel.

Figure 3:
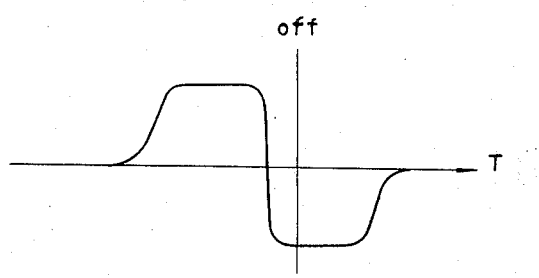
FIG. 3 is a diagram showing the waveform of magnetic flux of the flywheel magneto illustrated in FIG. 1; and, FIG. 4 is a diagram showing the waveform of magnetic flux of the flywheel magneto illustrated in FIG. 2.

Still referring to FIG. 1, a stator core 8 having a flat base portion, a pair of integral outside legs at the opposite sides thereof depending therefrom and having tapered end surfaces and a center leg parallel with the outside legs being slightly longer than and disposed substantially equally spaced between the outside legs, is shown being positioned within the flywheel magneto 10 such that the center leg thereof lies along a diammetrical line of the cylindrical flywheel 1 with the end surface thereof being spaced from the small arc segment 3' of one yoke to provide a predetermined gap therebetween and the outside legs face the arcuate poles 5, 5 with the tapered end surfaces thereof being spaced from the poles to provide arcuate gaps therebetween substantially equal to the gap between the center leg and the small arc segment of the one yoke. A generator or exciting coil 9 is wound in annular fashion within the stator core about the center leg thereof. It is further noted that the spacings between the arc poles 3' and the poles 5 of each of the magnetic block assemblies 2 are equal, whereby the magnetic flux crossing the exciting coil 9 is the resulting combination of $\phi_1$ and $\phi_2$, as shown in FIG. 1, and the magnetic flux wave shape is that shown in FIG. 3.

A flywheel magneto having the aforementioned construction may thus be assemblied according to the following method. Initially, a thermosettable adhesive resin may be applied between the contiguous surfaces of the yokes 3 and the ferrite magnets 4 thereof, as well as between the surfaces of the magnets 4 and the arc-shaped poles 5 thereof, thereby constructing the magnetic block assemblies 2. These block assemblies 2 may then be placed in a furnace for curing the thermosettable adhesive resin so as to permanently adhere the arc-shaped poles 5 to the respective ferrite magnets 4 and the ferrite magnets in turn to the respective large arcuate portions 12 of the yokes 3. The cured magnetic block assembly 2 may then be secured to the desired inner peripheral portion of the flywheel cylinder 1 by suitable fastening means, such as screws 7.

Figure 2:
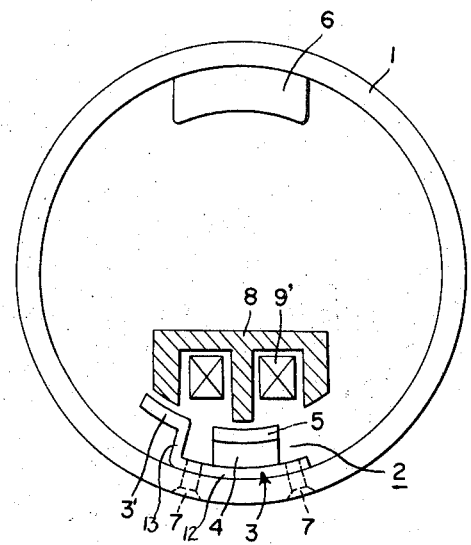
FIG. 2 is a front, partially sectioned, view of another embodiment of a flywheel magneto constructed according to this invention.
Figure 4:
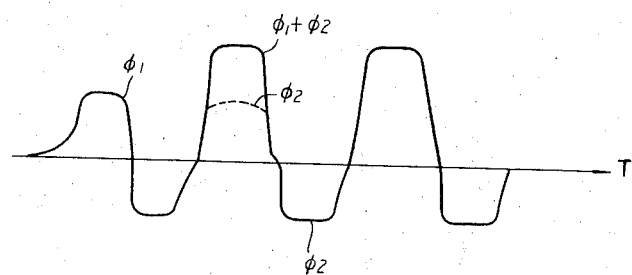

Referring now to the embodiment illustrated in FIG. 2, containing only one magnetic block assembly 2 secured to the inner circumferential surface of flywheel 1, whereas the embodiment of FIG. 1 discloses a plurality of magnetic block assemblies, the magnetic flux wave shape corresponding to this embodiment is illustrated in FIG. 4.

It should be noted in connection with the structures heretofore discussed, that in general, only a relatively small amount of magnetic energy from the magneto is required for ignition output, whereas an increased amount of energy may be required, depending upon the output, such as, for example, for starter lump outputs.

In accordance with the magneto of this invention, effective ignition output can be obtained by using only one magnetic block assembly, as illustrated in FIG. 2. On the other hand, effective starter lump output may be obtained by the use of a plurality of magnetic block assemblies, the combination of which results in increased output, due to the resulting combination of flux, as discussed heretofore in connection with FIGS. 1 and 3.

Also, as the magnetic path is formed by the magnetic block assemblies themselves, the flywheel need not be composed of a magnetic substance and may consequently be composed of, for example, aluminum or other suitable material, of light weight. However, the output of the magneto can be increased by utilizing magnetic substances for flywheel manufacture. Similarly, increased output may be obtained by properly positioning the arc poles and poles of the block assemblies, thereby assuring proper gap spacing and effective use of the magnetic energy generated. Similarly, when utilizing a plurality of magnetic block assemblies, proper directional alignment of the magnetic flux of each assembly will increase the output of the magneto.

Lastly, even with the magneto structure, wherein only one magnetic block assembly is utilized, increased output of the magneto, effective for lump ignition, may be obtained by opening the contact at the "off" position shown in FIG. 4.

Thus, it may be seen that the flywheel magneto of the present invention has important advantages over the known prior art structures in that furnaces of small heating capacity may be utilized in manufacturing the magnetos of the present invention, and consequently, in connection therewith, excess time normally required for additional heating and cooling of the flywheels is obviated, resulting in more economical manufacture and greater production. In addition, magnetos of various energy capacity output may be constructed and utilized for a multitude of purposes or under various conditions.

Obviously, many modifications and variations of the present invention are possible in light of the above teachings. It is to be understood, therefore, that within the scope of the appended claims, the present invention may be practiced otherwise than as specifically described herein.

What is claimed as new and desired to be secured by Letters Patent is:

1. A flywheel magneto comprising:
   a cylindrical flywheel;
   a yoke adhered to the cylindrical inner surface of said flywheel, said yoke having a substantially Z-shaped configuration in cross-section and being formed of an arc pole of a predetermined radius of curvature, an arc-shaped portion of a radius of curvature greater than that of said arc pole, and a radially extending arm integrally joining the ends of said arc pole and said arc-shaped portion for connecting the same;
   a ferrite magnet adhered to said arc-shaped portion of said yoke;
   an arc-shaped pole adhered to said ferrite magnet and positioned adjacent said arc pole;
   a stator core in said flywheel facing said arc-shaped pole and said arc pole and spaced therefrom a predetermined distance; and wherein said arc-shaped pole is adhered to said ferrite magnet and said ferrite magnet is adhered to said yoke with a thermosettable adhesive resin, and said yoke is non-adhesively secured to said flywheel.

2. A flywheel magneto as set forth in claim 1, wherein said yoke, said ferrite magnet, and said arc-shaped pole form a magnetic block assembly.

3. A flywheel magneto as set forth in claim 2, wherein two magnetic block assemblies are adhered to said flywheel, with said arc poles of said yokes and said arc-shaped poles being alternately arranged and equally spaced.

4. A flywheel magneto as set forth in claim 2, wherein said stator case comprises a flat base portion and three legs depending from the same side thereof in parallel relation.

5. A flywheel magneto as set forth in claim 4, wherein the spacing between the legs of said stator core is substantially equal to the spacing between said arc pole and said arc-shaped poles.

6. A flywheel magneto as set forth in claim 5, wherein said flywheel is made of magnetic material.

7. A flywheel magneto as set forth in claim 4, wherein said flywheel is made of non-magnetic material.

* * * * *